US012781896B2

(12) United States Patent
Liang et al.

(10) Patent No.: US 12,781,896 B2
(45) Date of Patent: Nov. 3, 2026

(54) QUICK-INSTALLATION EQUAL-RADIUS STRAIGHT-WAY JOINT STRUCTURE AND USE METHOD THEREOF

(71) Applicant: NANTONG TRIFLO VALVE CO., LTD., Nantong (CN)

(72) Inventors: Xinyu Liang, Nantong (CN); Senyang Li, Nantong (CN); Wei Tang, Nantong (CN)

(73) Assignee: Nantong Triflo Valve Co., Ltd., Nantong (CN)

( * ) Notice: Subject to any disclaimer, the term of this patent is extended or adjusted under 35 U.S.C. 154(b) by 0 days.

(21) Appl. No.: 19/212,747

(22) Filed: May 20, 2025

(65) Prior Publication Data

US 2026/0055835 A1 Feb. 26, 2026

Related U.S. Application Data

(63) Continuation-in-part of application No. PCT/CN2025/086790, filed on Apr. 2, 2025.

(30) Foreign Application Priority Data

Aug. 23, 2024 (CN) ........................ 202411162810.7

(51) Int. Cl.
*F16L 37/086* (2006.01)

(52) U.S. Cl.
CPC ................................. *F16L 37/086* (2013.01)

(58) Field of Classification Search
CPC .. E21B 33/038; E21B 17/046; E21B 17/0465; E21B 17/085; F16L 25/06;
(Continued)

(56) References Cited

U.S. PATENT DOCUMENTS 3,606,393 A * 9/1971 Huntsinger ........... F16L 25/065 411/116
4,606,557 A * 8/1986 Coffey .................. E21B 33/038 285/90
11,592,127 B2 * 2/2023 Belen ...................... F16B 33/02

FOREIGN PATENT DOCUMENTS

CN 110375131 A 10/2019
GB 166718 A * 7/1921 ............ F16L 37/113
GB 503031 A * 3/1939 ............ F16L 37/086

* cited by examiner

*Primary Examiner* — Matthew Troutman
*Assistant Examiner* — Alexander T Rufrano
(74) *Attorney, Agent, or Firm* — Bayramoglu Law Offices LLC

(57) ABSTRACT

A quick-installation equal-radius straight-way joint structure includes a first shell, second shells, positioning blocks, support pins, and retaining rings. The first shell is a hollow cylindrical or branched structure arranged horizontally, and left and right side surfaces of the first shell are each concentrically provided with the hollow cylindrical second shell, which are integrally formed. The upper and lower sides of the inner circumferential surface in the second shell are coaxially provided with arc-shaped slots communicating with the interior of the second shell, the upper and lower ends of the outer circumferential surface of the second shell are screwed with the positioning blocks, and the outer surface of the positioning block is embedded with an internal threaded hole. The retaining ring is coaxially arranged in the arc-shaped slot, and a T-shaped support pin is coaxially arranged in the internal threaded hole of the positioning block.

14 Claims, 5 Drawing Sheets

(58) Field of Classification Search
CPC ....... F16L 25/065; F16L 25/08; F16L 37/086; F16L 23/04
See application file for complete search history.

QUICK-INSTALLATION EQUAL-RADIUS STRAIGHT-WAY JOINT STRUCTURE AND USE METHOD THEREOF

CROSS REFERENCE TO THE RELATED APPLICATIONS

This application is a continuation-in-part application of International Application No. PCT/CN2025/086790, filed on Apr. 2, 2025, which is based upon and claims priority to Chinese Patent Application No. 202411162810.7, filed on Aug. 23, 2024, the entire contents of which are incorporated herein by reference.

TECHNICAL FIELD

The present invention relates to the technical field of pipeline joints, and in particular to a quick-installation equal-radius straight-way joint structure and a use method thereof.

BACKGROUND

As an important part of urban infrastructure construction, pipelines play the role of transmitting media. Due to the limitations of production, transportation, and installation of pipelines, it is necessary to cut the pipelines into multiple sections to facilitate transportation, and then connect multiple sections of pipelines through joints during installation.

At present, the pipes at two ends are fixed together by means of threading, flange connection, or clamping, but these fixing methods have the following disadvantages: 1) The threading connection requires that the two pipes be aligned and horizontal, and the pipes need to be rotated to install. Moreover, sufficient torque needs to be applied to the pipes to ensure a secure connection. 2) The flange connection requires aligning the two flange faces and aligning all flange holes, and then connecting with multiple bolts. The installation is time-consuming and labor-intensive. 3) The clamping is a connection carried out using other types of coupling. Generally, multiple shells need to be assembled around the pipe ends, which is also rather troublesome. Therefore, the above problems need to be solved urgently.

SUMMARY

The technical problem to be solved by the present invention is to provide a quick-installation equal-radius straight-way joint structure and a use method thereof. Through the cooperation of a first spring and a retaining ring, the retaining ring can be clamped in a groove of a pipeline, thus connecting the pipeline with the joint.

In order to solve the above technical problems, the present invention adopts the following technical solutions: a quick-installation equal-radius straight-way joint structure of the present invention is innovative in that it includes a first shell, second shells, positioning blocks, support pins, first springs, and retaining rings. The first shell is a hollow cylindrical or branched structure arranged horizontally, and left and right side surfaces of the first shell are each concentrically provided with the hollow cylindrical second shell, which are integrally formed. Arc-shaped slots are coaxially embedded in a middle position of each second shell relative to upper and lower sides of an inner circumferential surface of the second shell, and each arc-shaped slot is communicated with an interior of the corresponding second shell. The positioning blocks are respectively screwed at upper and lower ends of an outer circumferential surface of each second shell, and an internal threaded hole is vertically embedded in a middle of an outer surface of each positioning block to ensure that the internal threaded hole does not extend out of an inner surface of the corresponding positioning block. An annular groove is coaxially embedded in an outer circumferential surface of the pipeline near an end of the pipeline, and an arc-shaped retaining ring matched with the groove is coaxially arranged in each arc-shaped slot. A T-shaped support pin is coaxially and slidably sleeved in the internal threaded hole of each positioning block, a small-diameter end of each support pin extends into the corresponding arc-shaped slot along the radial direction of the second shell and is screwed and fixed with a middle position of an outer arc surface of the corresponding retaining ring. The first spring is coaxially sleeved between the positioning block and the corresponding retaining ring on the small-diameter end of each support pin, and after the pipeline is coaxially sleeved in the corresponding second shell, the retaining ring is clamped in the corresponding groove by a spring force of the first spring, thereby connecting the pipeline with the corresponding second shell.

Preferably, an inner diameter of each second shell is matched with an outer diameter of the pipeline, and an interior of each second shell is communicated with an interior of the first shell. An outer diameter of each second shell is larger than an outer diameter of the first shell, and a section of the two after integral forming is I-shaped, and then form an equal-radius straight-way structure.

Preferably, a width of each arc-shaped slot is smaller than a lateral width of the corresponding second shell, an inner diameter of each arc-shaped slot is corresponding to an inner diameter of the corresponding second shell, and an outer diameter of each arc-shaped slot is smaller than an outer diameter of the corresponding second shell.

Preferably, each positioning block has a cylindrical structure and is arranged along a radial direction of the second shell, an inner surface of each positioning block is coaxially attached with a circular boss, and each circular boss is integrally formed with the corresponding positioning block. A diameter of each circular boss is smaller than a diameter of the corresponding positioning block, and an external thread is also provided on an outer circumferential surface of each circular boss. Each positioning block is screwed and fixed with a corresponding position of an outer circumferential surface of the corresponding second shell through the boss, and it is necessary to ensure that the bosses extend into the corresponding arc-shaped slot and are respectively arranged at intervals outside the corresponding retaining ring.

Preferably, a diameter of the small-diameter end of each support pin is smaller than a diameter of the corresponding circular boss, sliding, towards a center of the corresponding second shell, of the support pin is limited by the positioning block; an outer diameter of a large-diameter end of each support pin is smaller than a diameter of the corresponding internal threaded hole, and it is necessary to ensure that the internal threaded hole does not interfere with sliding of the support pin in the corresponding positioning block along the radial direction of the second shell.

Preferably, a width of each retaining ring is matched with a diameter of the corresponding circular boss and a width of the groove of the pipeline, and it is necessary to ensure that after the positioning block is detached from the corresponding second shell, the retaining ring is detached from the corresponding second shell with the positioning block through the support pin. An inner arc surface of each retaining ring is an inner conical surface matched with the outer circumferential surface of the pipeline, a diameter of the retaining ring on a side far away from the first shell is larger than an outer diameter of the pipeline, and a diameter of the retaining ring on a side adjacent to the first shell is smaller than the outer diameter of the pipeline. When the pipeline is coaxially inserted into the corresponding second shell, the retaining ring is pushed in a direction far away from the pipeline to compress the first spring, when the groove moves with the pipeline to a position relative to the retaining ring, the retaining ring is clamped in the groove of the pipeline by the spring force of the first spring.

Preferably, sealing rings matched with the pipeline are also symmetrically and coaxially sleeved inside the first shell at left and right intervals, a setting position of each sealing ring needs to ensure that an end of the pipeline is coaxially inserted into the corresponding sealing ring when the retaining ring is clamped in the groove.

Preferably, a positioning bolt is further included. The positioning bolt matched with the internal threaded hole is coaxially screwed in the internal threaded hole of each positioning block, the support pin is limited by an abutting contact of each positioning bolt with an end face of a large-diameter end of the corresponding support pin, thus ensuring that the retaining ring is always clamped in the groove of the pipeline.

A use method of the quick-installation equal-radius straight-way joint structure of the present invention is innovative in that it includes the following steps:

- step 1: loosening the positioning bolt to generate a gap between the positioning bolt and the end face of the large-diameter end of the corresponding support pin and ensure that the support pin is allowed to slide within the gap;
- step 2: inserting an end of the pipeline adjacent to the groove into the corresponding second shell concentrically, where the outer circumferential surface of the pipeline is subjected to contact with the inner arc surface of the corresponding retaining ring, the corresponding retaining ring is squeezed with a continuous insertion of the pipeline, and the retaining ring is subjected to move in a direction of approaching the corresponding positioning block along the radial direction of the second shell to compress the corresponding first spring;
- step 3: when the end of the pipeline is coaxially inserted into the corresponding sealing ring, subjecting the groove of the pipeline to directly face the retaining ring, and subjecting, under the spring force of the first spring, the retaining ring to move in a direction of approaching the pipeline along the radial direction of the second shell and to be clamped in the groove of the pipeline, to connect the pipeline with the corresponding second shell;
- step 4: tightening the positioning bolt to make the positioning bolt abut against the end face of the large-diameter end of the corresponding support pin and limit the support pin, to ensure that the retaining ring is always clamped in the groove of the pipeline; and
- step 5: when the pipeline needs to be detached, loosening the positioning bolt, and then loosening the positioning block, so that the pipeline is allowed to be detached from the corresponding second shell with the positioning block; detaching the retaining ring from the corresponding second shell with the positioning block through the support pin to detach the pipeline from the corresponding second shell.

The present invention has the following beneficial effects:

(1) Through the cooperation of the first spring and the retaining ring, the retaining ring can be clamped in the groove of the pipeline, thus connecting the pipeline with the joint.

(2) The support pin is supported by tightening the positioning bolt, so that the support pin is convenient to be limited, the retaining ring is always clamped in the groove of the pipeline, and the stability of the connection between the pipeline and the joint is ensured to realize a rigid connection. Additionally, by loosening the positioning bolt, a gap is generated between the support pin and the positioning bolt, allowing the pipeline, the retaining ring, and the support pin as a whole to be able to move within a small range relative to the second shell, thereby achieving a flexible connection. That is, the present invention forms the flexible connection or the rigid connection by adjusting the tightness of the positioning bolt.

(3) Through the screw connection design of the positioning block, it is convenient to detach the retaining ring from the groove of the pipeline by detaching the positioning block, so as to detach the pipeline from the joint.

BRIEF DESCRIPTION OF THE DRAWINGS

In order to illustrate the technical solution in the embodiment of the present invention more clearly, the drawings needed in the embodiment will be briefly introduced below. Obviously, the drawings in the following description are only some embodiments recorded in the present invention. For the ordinary skilled in the art, other drawings can be obtained according to these drawings without creative work.

In figures, 1—first shell; 2—second shell; 3—sealing ring; 4—retaining ring; 5—first spring; 6—support pin; 7—positioning bolt; 8—positioning block; 9—groove; 10—arc-shaped slot; 11—internal threaded hole; and 12—pipeline; 13—left and right side surfaces of the first shell; 14—upper and lower sides of the inner circumferential surface of the second shell; 15—interior of the corresponding second shell; 16—inner diameter of the corresponding second shell; 17—interior of the first shell; 18—diameter of each circular boss; 19—diameter of the corresponding positioning block; 20—diameter of the small-diameter end of each support pin; 21—outer diameter of the large-diameter end of each support pin; 22—width of each arc-shaped slot; 23—lateral width of the corresponding second shell; 24—outer diameter of the corresponding second shell; 25—outer diameter of each arc-shaped slot; 26—inner diameter of each arc-shaped slot; 27—width of each retaining ring; 28—width of the annular groove of the pipeline; 29—diameter of the retaining ring on the side adjacent to the first shell; 30—diameter of the retaining ring on the side far away from the first shell; and 31—outer diameter of the pipeline.

DETAILED DESCRIPTION OF THE EMBODIMENTS

The technical solutions of the present invention are clearly and completely described below with reference to specific implementations.

Figure 1:
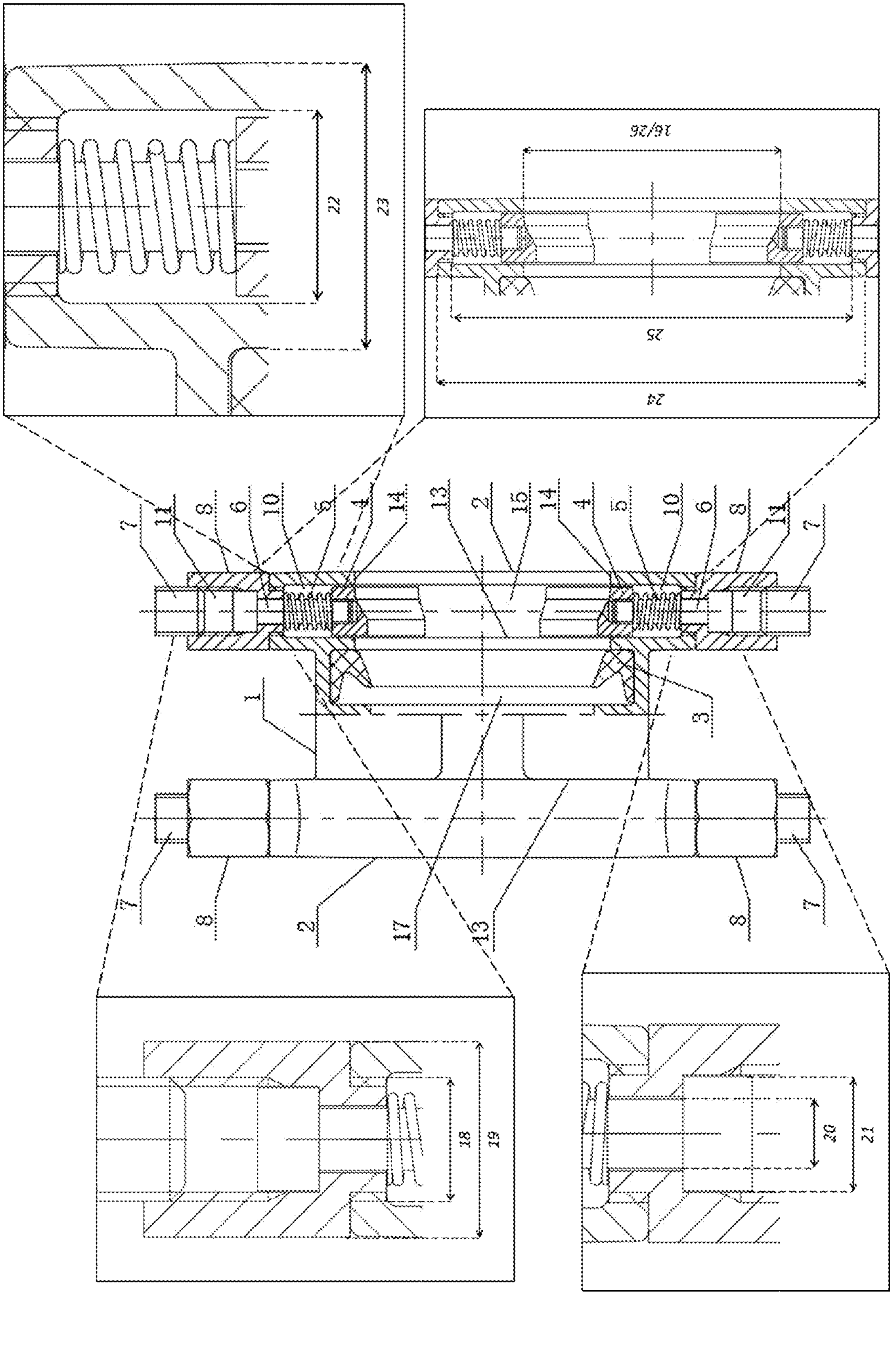
FIG. 1 is a schematic structural diagram of a quick-installation equal-radius straight-way joint structure of the present invention.
Figure 2:
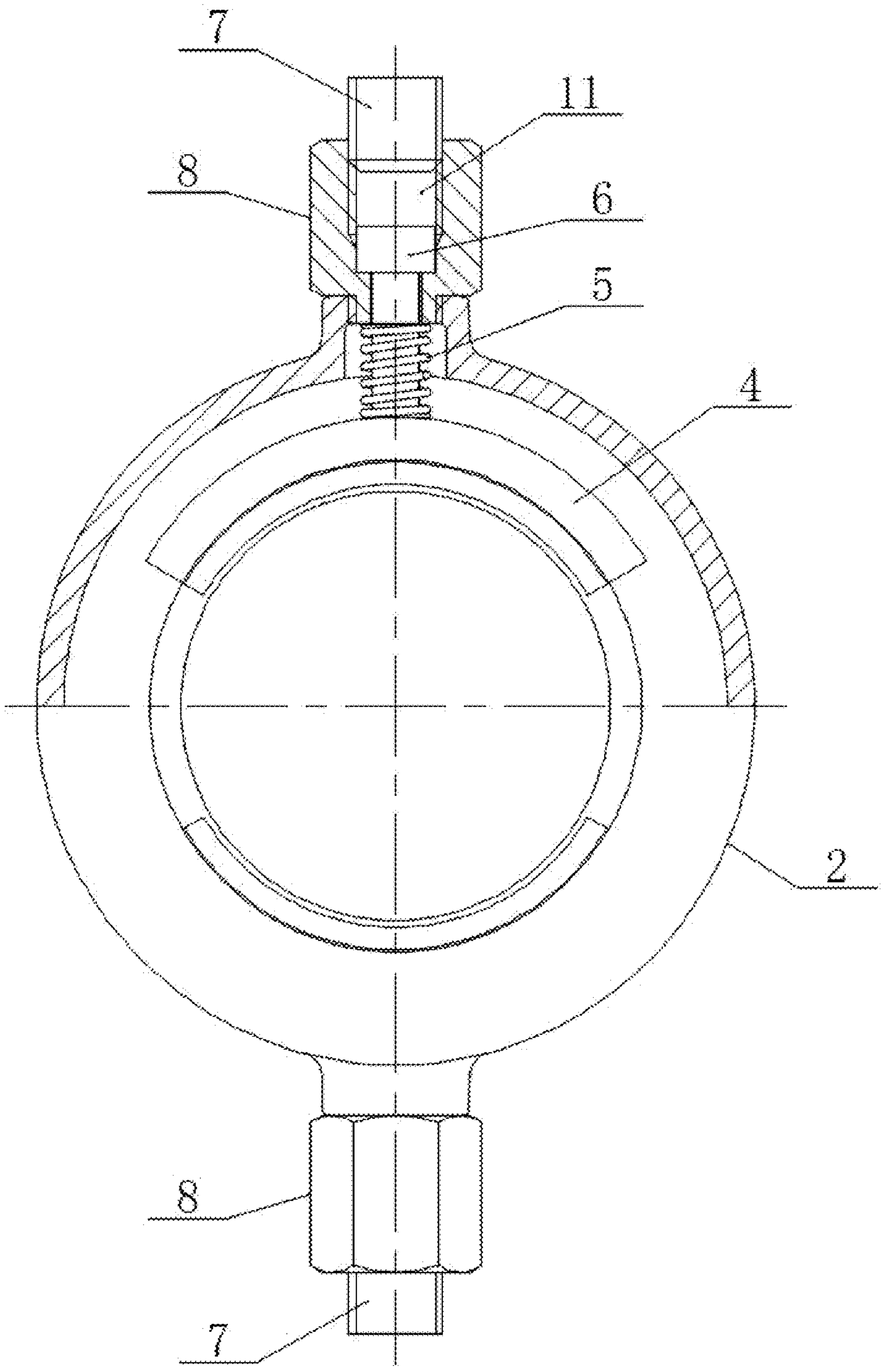
FIG. 2 is a side view of FIG. 1.
Figure 3:
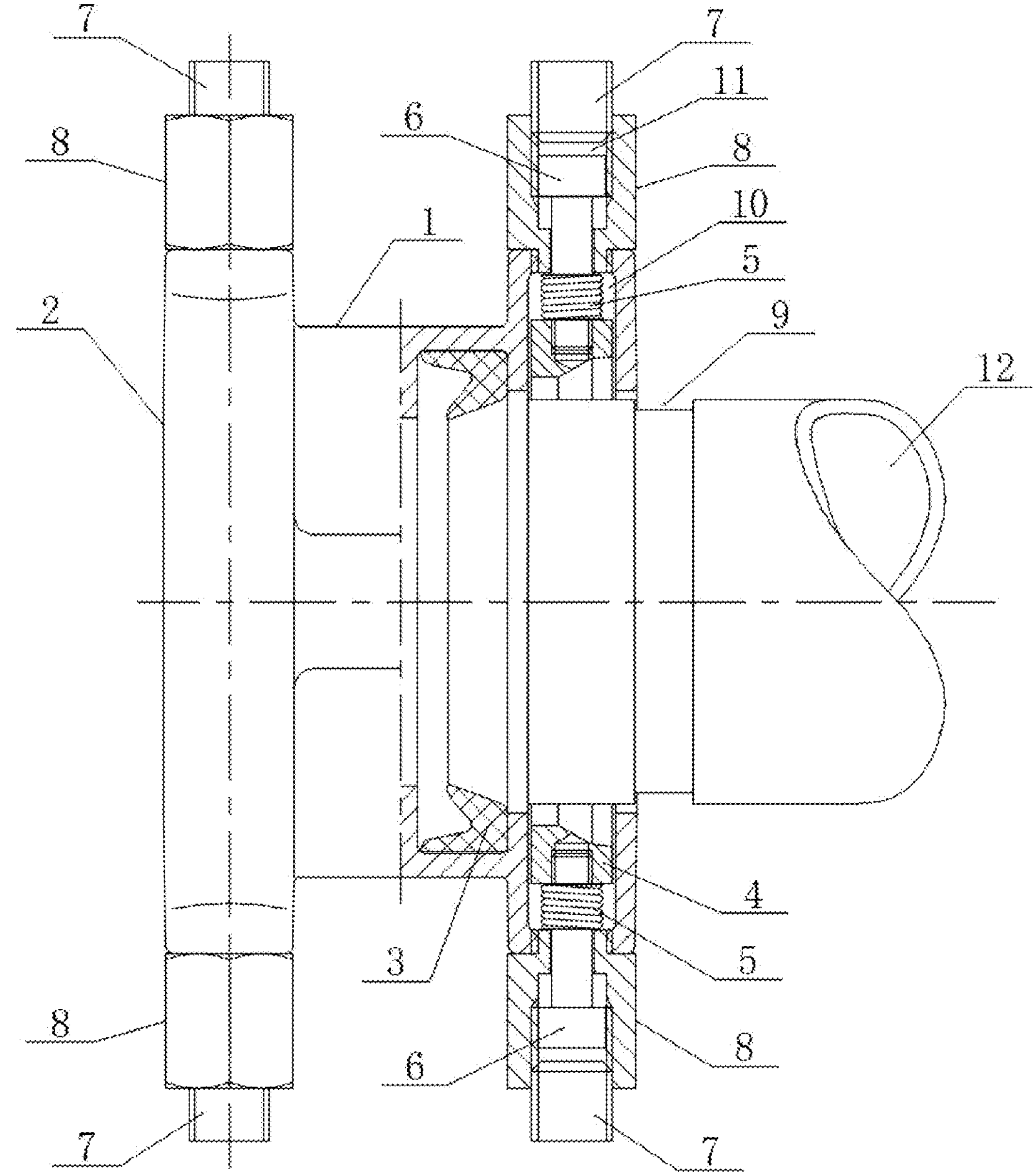
FIG. 3 is a schematic diagram showing the state when a pipeline is in contact with a retaining ring in the present invention.
Figure 4:
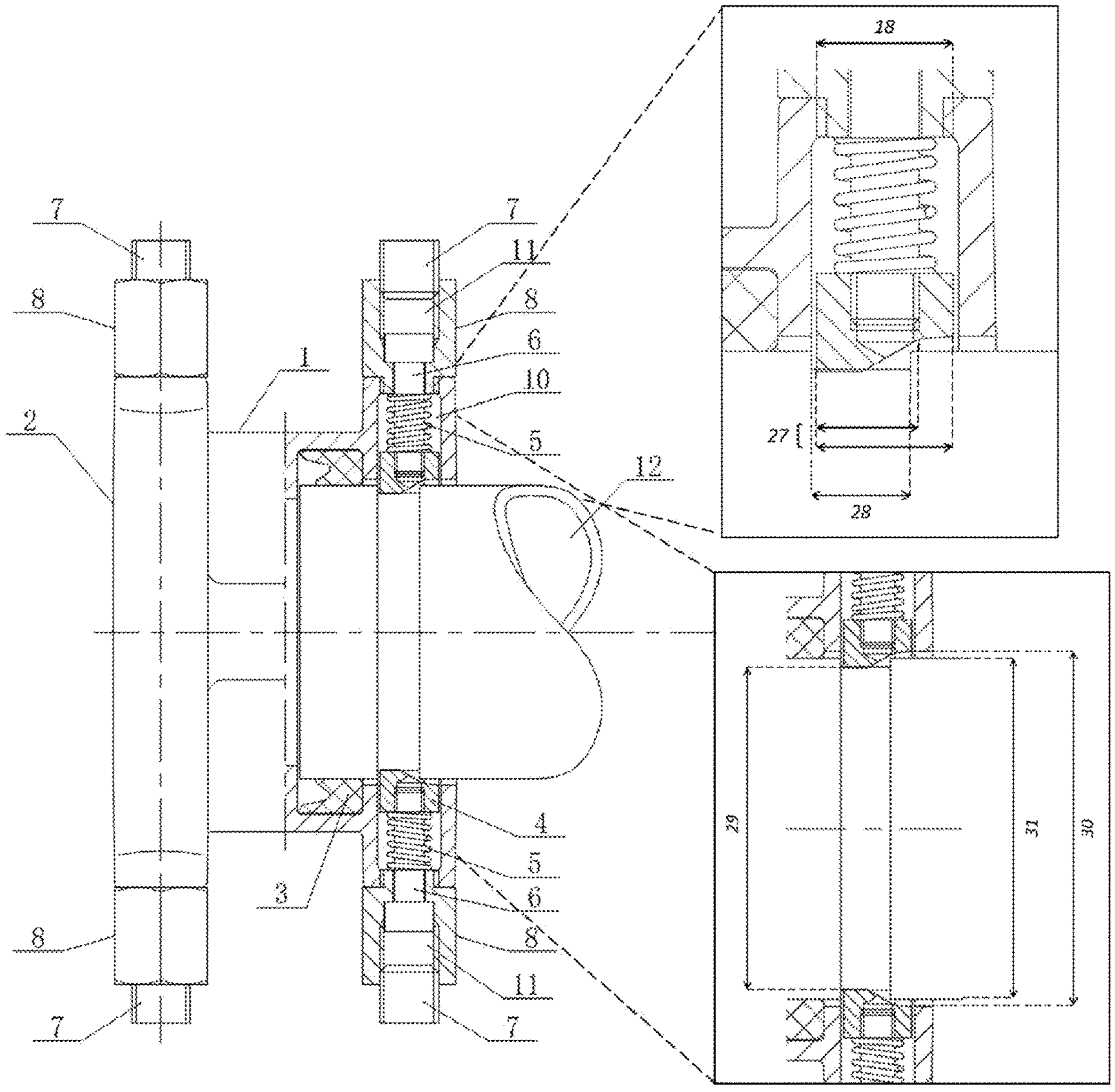
FIG. 4 is a schematic diagram showing the state when the retaining ring is clamped in the groove of the pipeline in the present invention.
Figure 5:
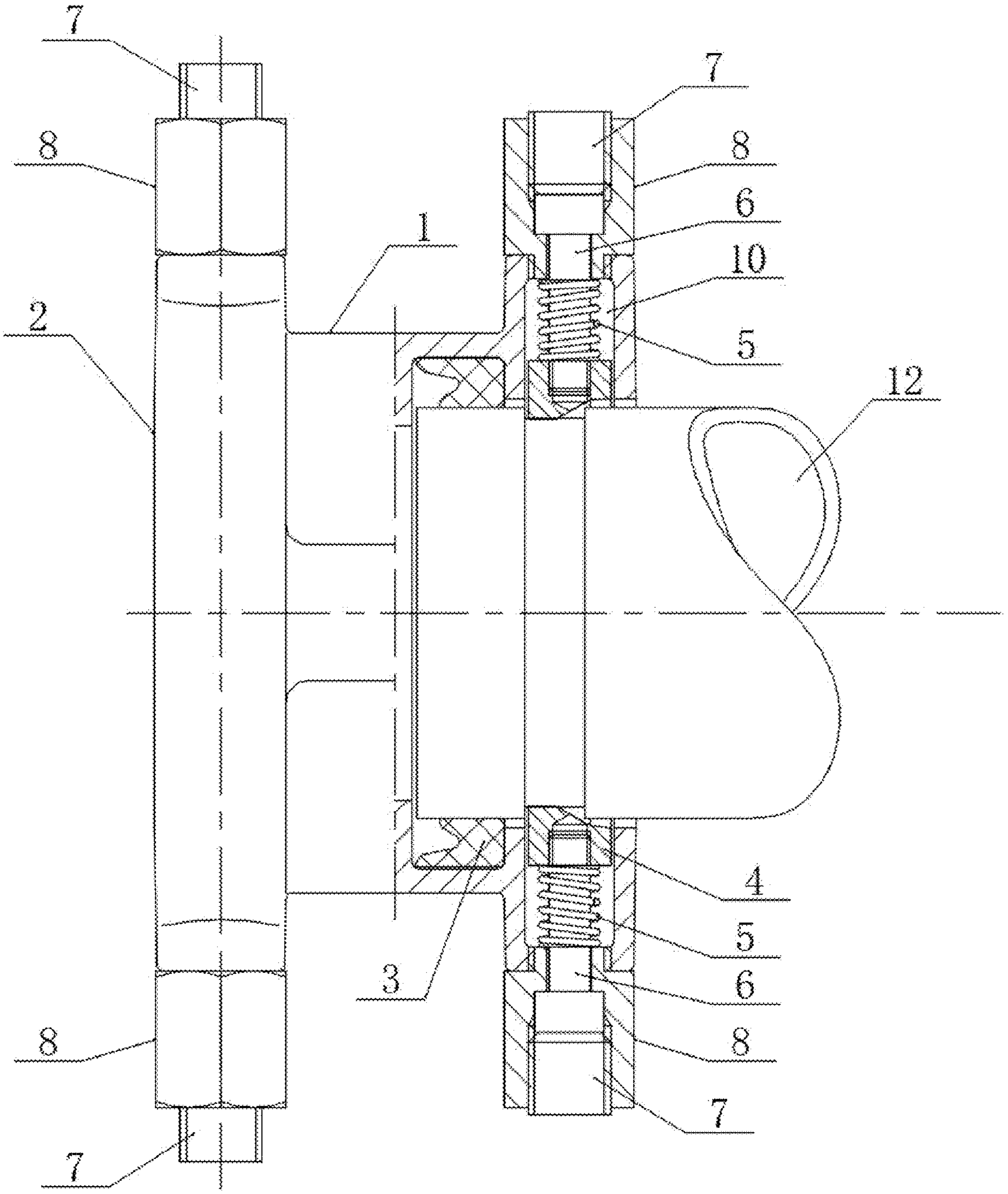
FIG. 5 is a schematic diagram showing the state when a positioning bolt abuts against a support pin in the present invention.

The present invention provides a quick-installation equal-radius straight-way joint structure, including the first shell 1, the second shells 2, the positioning blocks 8, the support pins 6, the first springs 5, and the retaining rings 4. The specific structures are shown in FIGS. 1-5. The first shell 1 is a hollow cylindrical or branched structure arranged horizontally, and left and right side surfaces of the first shell 1 are each concentrically provided with the hollow cylindrical second shell 2, which are integrally formed. An inner diameter of each second shell 2 is matched with an outer diameter of the pipeline 12, and an interior of each second shell 2 is communicated with an interior of the first shell 1. An outer diameter of each second shell 2 is larger than an outer diameter of the first shell 1, and a section of the two after integral forming is I-shaped, and then form an equal-radius straight-way structure.

As shown in FIGS. 1-5, the arc-shaped slots 10 are coaxially embedded in a middle position of each second shell 2 relative to upper and lower sides of an inner circumferential surface of the second shell 2, and each arc-shaped slot 10 is communicated with an interior of the corresponding second shell 2. A width of each arc-shaped slot 10 is smaller than a lateral width of the corresponding second shell 2, an inner diameter of each arc-shaped slot 10 is corresponding to an inner diameter of the corresponding second shell 2, and an outer diameter of each arc-shaped slot 10 is smaller than an outer diameter of the corresponding second shell 2.

According to the present invention, the annular groove 9 is coaxially embedded in an outer circumferential surface of the pipeline 12 near an end of the pipeline 12, and the arc-shaped retaining ring 4 matched with the groove 9 is coaxially arranged in each arc-shaped slot 10. As shown in FIGS. 1-5, the positioning blocks 8 are respectively screwed at upper and lower ends of an outer circumferential surface of each second shell 2, and the internal threaded hole 11 is vertically embedded in a middle of an outer surface of each positioning block 8 to ensure that the internal threaded hole 11 does not extend out of an inner surface of the corresponding positioning block 8. Each positioning block 8 has a cylindrical structure and is arranged along a radial direction of the second shell 2, an inner surface of each positioning block 8 is coaxially attached with a circular boss, and each circular boss is integrally formed with the corresponding positioning block 8. A diameter of each circular boss is smaller than a diameter of the corresponding positioning block 8, and an external thread is also provided on an outer circumferential surface of each circular boss. Each positioning block 8 is screwed and fixed with a corresponding position of an outer circumferential surface of the corresponding second shell 2 through the boss, and it is necessary to ensure that the bosses extend into the corresponding arc-shaped slot 10, that is, the bosses are communicated with the arc-shaped slot 10 and respectively arranged at intervals outside the corresponding retaining ring 4.

According to the present invention, the T-shaped support pin 6 is coaxially and slidably sleeved in the internal threaded hole 11 of each positioning block 8. As shown in FIGS. 1-5, a small-diameter end of each support pin 6 extends into the corresponding arc-shaped slot 10 along the radial direction of the second shell 2 and is screwed and fixed with a middle position of an outer arc surface of the corresponding retaining ring 4. The first spring 5 is coaxially sleeved between the positioning block 8 and the corresponding retaining ring 4 on the small-diameter end of each support pin 6, and after the pipeline 12 is coaxially sleeved in the corresponding second shell 2, the retaining ring 4 is clamped in the corresponding groove 9 by a spring force of the first spring 5, thereby connecting the pipeline 12 with the corresponding second shell 2. A diameter of the small-diameter end of each support pin 6 is smaller than a diameter of the corresponding circular boss, the internal threaded hole 11 is a stepped hole, and a diameter of a large-diameter end of the T-shaped support pin 6 is larger than a diameter of a small-diameter section of the internal threaded hole 11, that is, the sliding, towards a center of the corresponding second shell 2, of the support pin 6 is limited by the positioning block 8. An outer diameter of the large-diameter end of each support pin 6 is smaller than an inner diameter of a large-diameter section of the corresponding internal threaded hole 11, and it is necessary to ensure that the internal threaded hole 11 does not interfere with the sliding of the support pin 6 in the corresponding positioning block 8 along the radial direction of the second shell 2.

As shown in FIGS. 1-5, a width of each retaining ring 4 is matched with a diameter of the corresponding circular boss and a width of the groove 9 of the pipeline 12, and it is necessary to ensure that after the positioning block 8 is detached from the corresponding second shell 2, the retaining ring 4 is detached from the groove 9 in the corresponding second shell 2 with the positioning block 8 through the support pin 6. An inner arc surface of each retaining ring 4 is an inner conical surface matched with the outer circumferential surface of the pipeline 12 (the groove 9 and its connecting part). When the pipeline 12 is inserted into the second shell 2, a diameter of the retaining ring 4 on a side far away from the first shell 1 is larger than the outer diameter of the pipeline 12, and a diameter of the retaining ring 4 on a side adjacent to the first shell 1 is smaller than the outer diameter of the pipeline 12. When the pipeline 12 is coaxially inserted into the corresponding second shell 2, the retaining ring 4 is pushed in a direction far away from the pipeline 12 to compress the first spring 5. When the groove 9 moves with the pipeline 12 to a position relative to the retaining ring 4, the retaining ring 4 is clamped in the groove 9 of the pipeline 12 by the spring force of the first spring 5.

As shown in FIGS. 1-5, the sealing rings 3 matched with the pipeline 12 are also symmetrically and coaxially sleeved inside the first shell 1 at left and right intervals, a setting position of each sealing ring 3 needs to ensure that an end of the pipeline 12 is coaxially inserted into the corresponding sealing ring 3 when the retaining ring 4 is clamped in the groove 9.

As shown in FIGS. 1-5, the positioning bolt 7 matched with the internal threaded hole 11 is coaxially screwed in the internal threaded hole 11 of each positioning block 8, and after the pipeline 12 is inserted into the second shell 2, the support pin 6 is limited by an abutting contact of each positioning bolt 7 with an end face of the large-diameter end of the corresponding support pin 6, thus ensuring that the retaining ring 4 is always clamped in the groove 9 of the pipeline 12 and ensuring the stability of the connection between the pipeline 12 and the joint.

The technical solutions of the present invention are not only suitable for equal-radius straight-way joints, but also suitable for differential-radius straight-way joints, 90-degree elbows, 45-degree elbows, positive tee joints and the like, and their principles are similar to that of the present application, so it is not repeated here.

The present invention provides a use method of the quick-installation equal-radius straight-way joint structure, as shown in FIGS. 1-5, including the following steps:

Step 1: the positioning bolt 7 is loosened to generate a gap between the positioning bolt 7 and the end face of the large-diameter end of the corresponding support pin 6 and ensure that the support pin 6 is allowed to slide within the gap.

Step 2: an end of the pipeline 12 adjacent to the groove 9 is inserted into the corresponding second shell 2 concentrically, where the outer circumferential surface of the pipeline 12 is subjected to contact with the inner arc surface of the corresponding retaining ring 4, the corresponding retaining ring 4 is squeezed with a continuous insertion of the pipeline 12, and the retaining ring 4 is subjected to move in a direction of approaching the corresponding positioning block 8 along the radial direction of the second shell 2 to compress the corresponding first spring 5.

Step 3: when the end of the pipeline 12 is coaxially inserted into the corresponding sealing ring 3, the groove 9 of the pipeline 12 is subjected to directly face the retaining ring 4, and under the spring force of the first spring 5, the retaining ring 4 is subjected to move in a direction of approaching the pipeline 12 along the radial direction of the second shell 2 and to be clamped in the groove 9 of the pipeline 12, to connect the pipeline 12 with the corresponding second shell 2.

Step 4: the positioning bolt 7 is tightened to make the positioning bolt 7 abut against the end face of the large-diameter end of the corresponding support pin 6 and limit the support pin 6, to ensure that the retaining ring 4 is always clamped in the groove 9 of the pipeline 12.

Step 5: when the pipeline 12 needs to be detached, the positioning bolt 7 is loosened, and then the positioning block 8 is loosened, so that the pipeline 12 is allowed to be detached from the corresponding second shell 2 with the positioning block 8; specifically, the retaining ring 4 is detached from the groove 9 of the corresponding second shell 2 with the positioning block 8 through the support pin 6 to detach the pipeline 12 from the corresponding second shell 2.

The above-mentioned embodiment is only a description of the preferred embodiment of the present invention, and does not limit the concept and scope of the present invention. Under the premise of not departing from the design concept of the present invention, various modifications and improvements made by ordinary engineers and technicians in the field should fall within the scope of protection of the present invention, and the technical contents of the present invention have all been recorded in the claims.

What is claimed is:

1. A quick-installation equal-radius straight-way joint structure, comprising a first shell, second shells, positioning blocks, support pins, first springs, and retaining rings; wherein the first shell is a hollow cylindrical or branched structure arranged horizontally, and left and right side surfaces of the first shell are each concentrically provided with the second shell, wherein the second shells are hollow cylindrical and are integrally formed with the first shell;

arc-shaped slots are coaxially embedded in a middle position of each of the second shells relative to upper and lower sides of an inner circumferential surface of the second shell, and each of the arc-shaped slots is communicated with an interior of the corresponding second shell;

the positioning blocks are respectively screwed at upper and lower ends of an outer circumferential surface of each of the second shells, and an internal threaded hole is vertically embedded in a middle of an outer surface of each of the positioning blocks to ensure that the internal threaded hole does not extend out of an inner surface of the corresponding positioning block;

an annular groove is coaxially embedded in an outer circumferential surface of a pipeline near an end of the pipeline, and the retaining ring is arc-shaped and is coaxially arranged in each of the arc-shaped slots;

the support pin is T-shaped and is coaxially and slidably sleeved in the internal threaded hole of each of the positioning blocks, a small-diameter end of each of the support pins extends into the corresponding arc-shaped slot along a radial direction of the second shell and is screwed and fixed with a middle position of an outer arc surface of the corresponding retaining ring;

the first spring is coaxially sleeved between the positioning block and the corresponding retaining ring on the small-diameter end of each of the support pins, and after the pipeline is coaxially sleeved in the corresponding second shell, the retaining ring is clamped in the corresponding annular groove by a spring force of the first spring, thereby connecting the pipeline with the corresponding second shell; and wherein each of the positioning blocks has a cylindrical structure and is arranged along the radial direction of the second shell, an inner surface of each of the positioning blocks is coaxially attached with a circular boss, and each circular boss is integrally formed with the corresponding positioning block;

a diameter of each circular boss is smaller than a diameter of the corresponding positioning block, and an external thread is provided on an outer circumferential surface of each circular boss; and each of the positioning blocks is screwed and fixed with a corresponding position of the outer circumferential surface of the corresponding second shell by the circular boss, and it is necessary to ensure that the circular bosses extend into the corresponding arc-shaped slot and are respectively arranged at intervals outside the corresponding retaining ring.

2. The quick-installation equal-radius straight-way joint structure according to claim 1, wherein an inner diameter of each of the second shells corresponds to an outer diameter of the pipeline, and the interior of each of the second shells is communicated with an interior of the first shell before the pipeline is coaxially sleeved in the corresponding second shell; and an outer diameter of each of the second shells is larger than an outer diameter of the first shell, and a section of the first shell and the second shells after integral forming is I-shaped.

3. The quick-installation equal-radius straight-way joint structure according to claim 1, wherein a width of each of the arc-shaped slots is smaller than a lateral width of the corresponding second shell, an inner diameter of each of the arc-shaped slots is corresponding to an inner diameter of the corresponding second shell, and an outer diameter of each of the arc-shaped slots is smaller than an outer diameter of the corresponding second shell.

4. The quick-installation equal-radius straight-way joint structure according to claim 1, wherein a diameter of the small-diameter end of each of the support pins is smaller than a diameter of the corresponding circular boss, sliding, towards a center of the corresponding second shell, of the support pin is limited by the positioning block; and an outer diameter of a large-diameter end of each of the support pins is smaller than a diameter of the corresponding internal threaded hole, and it is necessary to ensure that the internal threaded hole does not interfere with sliding of the support pin in the corresponding positioning block along the radial direction of the second shell.

5. The quick-installation equal-radius straight-way joint structure according to claim 1, wherein a width of each of the retaining rings corresponds to a diameter of the corresponding circular boss and a width of the annular groove of the pipeline, and it is necessary to ensure that after the positioning block is detached from the corresponding second shell, the retaining ring is detached from the corresponding second shell with the positioning block through the support pin;

an inner arc surface of each of the retaining rings is an inner conical surface corresponding to the outer circumferential surface of the pipeline, a diameter of the retaining ring on a side far away from the first shell is larger than an outer diameter of the pipeline, and a diameter of the retaining ring on a side adjacent to the first shell is smaller than the outer diameter of the pipeline; and when the pipeline is coaxially inserted into the corresponding second shell, the retaining ring is pushed in a direction far away from the pipeline to compress the first spring, when the annular groove moves with the pipeline to a position relative to the retaining ring, the retaining ring is clamped in the annular groove of the pipeline by the spring force of the first spring.

6. The quick-installation equal-radius straight-way joint structure according to claim 5, wherein sealing rings are symmetrically and coaxially sleeved inside the first shell at left and right intervals, a setting position of each of the sealing rings needs to ensure that the end of the pipeline is coaxially inserted into the corresponding sealing ring when the retaining ring is clamped in the annular groove.

7. The quick-installation equal-radius straight-way joint structure according to claim 5, further comprising a positioning bolt, wherein the positioning bolt is coaxially screwed in the internal threaded hole of each of the positioning blocks, the support pin is limited by an abutting contact of each of the positioning bolts with an end face of a large-diameter end of the corresponding support pin, thus ensuring that the retaining ring is always clamped in the annular groove of the pipeline.

8. A method of use comprising the following steps performed using the quick-installation equal-radius straight-way joint structure according to claim 1:

step 1: loosening a positioning bolt to generate a gap between the positioning bolt and an end face of a large-diameter end of the corresponding support pin and ensure that the support pin is allowed to slide within the gap;

step 2: inserting the end of the pipeline adjacent to the annular groove into the corresponding second shell concentrically, wherein the outer circumferential surface of the pipeline is subjected to contact with an inner arc surface of the corresponding retaining ring, the corresponding retaining ring is squeezed with a continuous insertion of the pipeline, and the retaining ring is subjected to move in a direction of approaching the corresponding positioning block along the radial direction of the second shell to compress the corresponding first spring;

step 3: when the end of the pipeline is coaxially inserted into a corresponding sealing ring, subjecting the annular groove of the pipeline to directly face the retaining ring, and subjecting, under the spring force of the first spring, the retaining ring to move in a direction of approaching the pipeline along the radial direction of the second shell and to be clamped in the annular groove of the pipeline, to connect the pipeline with the corresponding second shell;

step 4: tightening the positioning bolt to make the positioning bolt abut against the end face of the large-diameter end of the corresponding support pin and limit the support pin, to ensure that the retaining ring is always clamped in the annular groove of the pipeline; and step 5: when the pipeline needs to be detached, loosening the positioning bolt, and then loosening the positioning block, so that the pipeline is allowed to be detached from the corresponding second shell with the positioning block; detaching the retaining ring from the corresponding second shell with the positioning block through the support pin to detach the pipeline from the corresponding second shell.

9. The use method according to claim 8, wherein in the quick-installation equal-radius straight-way joint structure, an inner diameter of each of the second shells corresponds to an outer diameter of the pipeline, and the interior of each of the second shells is communicated with an interior of the first shell before the pipeline is coaxially sleeved in the corresponding second shell; and an outer diameter of each of the second shells is larger than an outer diameter of the first shell, and a section of the first shell and the second shells after integral forming is I-shaped.

10. The use method according to claim 8, wherein in the quick-installation equal-radius straight-way joint structure, a width of each of the arc-shaped slots is smaller than a lateral width of the corresponding second shell, an inner diameter of each of the arc-shaped slots is corresponding to an inner diameter of the corresponding second shell, and an outer diameter of each of the arc-shaped slots is smaller than an outer diameter of the corresponding second shell.

11. The use method according to claim 8, wherein in the quick-installation equal-radius straight-way joint structure, a diameter of the small-diameter end of each of the support pins is smaller than a diameter of the corresponding circular boss, sliding, towards a center of the corresponding second shell, of the support pin is limited by the positioning block; and an outer diameter of a large-diameter end of each of the support pins is smaller than a diameter of the corresponding internal threaded hole, and it is necessary to ensure that the internal threaded hole does not interfere with sliding of the support pin in the corresponding positioning block along the radial direction of the second shell.

12. The use method according to claim 8, wherein in the quick-installation equal-radius straight-way joint structure, a width of each of the retaining rings corresponds to a diameter of the corresponding circular boss and a width of the annular groove of the pipeline, and it is necessary to ensure that after the positioning block is detached from the corresponding second shell, the retaining ring is detached from the corresponding second shell with the positioning block through the support pin;

an inner arc surface of each of the retaining rings is an inner conical surface corresponding to the outer circumferential surface of the pipeline, a diameter of the retaining ring on a side far away from the first shell is larger than an outer diameter of the pipeline, and a diameter of the retaining ring on a side adjacent to the first shell is smaller than the outer diameter of the pipeline; and when the pipeline is coaxially inserted into the corresponding second shell, the retaining ring is pushed in a direction far away from the pipeline to compress the first spring, when the annular groove moves with the pipeline to a position relative to the retaining ring, the retaining ring is clamped in the annular groove of the pipeline by the spring force of the first spring.

13. The use method according to claim 12, wherein in the quick-installation equal-radius straight-way joint structure, sealing rings are symmetrically and coaxially sleeved inside the first shell at left and right intervals, a setting position of each of the sealing rings needs to ensure that the end of the pipeline is coaxially inserted into the corresponding sealing ring when the retaining ring is clamped in the annular groove.

14. The use method according to claim 12, wherein the positioning bolt is coaxially screwed in the internal threaded hole of each of the positioning blocks, the support pin is limited by an abutting contact of each of the positioning bolts with the end face of the large-diameter end of the corresponding support pin, thus ensuring that the retaining ring is always clamped in the annular groove of the pipeline.

* * * * *